(12) United States Patent
Brzoskowski et al.

(10) Patent No.: US 6,548,562 B2
(45) Date of Patent: Apr. 15, 2003

(54) FOAMED THERMO-ELASTIC ARTICLE

(75) Inventors: Ryszard Brzoskowski, Acton, MA (US); Mohammad R. Sadeghi, Leominster, MA (US); Yungdong Wang, Leominster, MA (US)

(73) Assignee: DSM N.V., Heerlen (NL)

( * ) Notice: Subject to any disclaimer, the term of this patent is extended or adjusted under 35 U.S.C. 154(b) by 117 days.

(21) Appl. No.: 09/740,024

(22) Filed: Dec. 20, 2000

(65) Prior Publication Data

US 2002/0002210 A1 Jan. 3, 2002

Related U.S. Application Data

(63) Continuation of application No. PCT/NL99/00382, filed on Jun. 21, 1999.
(60) Provisional application No. 60/090,316, filed on Jun. 23, 1998.

(51) Int. Cl.[7] ................ C08J 9/02; C08J 9/04
(52) U.S. Cl. ............... 521/79; 521/82; 521/92; 521/93; 521/94; 521/95; 521/97; 521/98; 521/139; 521/140; 521/142
(58) Field of Search ............... 521/142, 79, 98, 521/94, 95, 82, 92, 93, 139, 140

(56) References Cited

U.S. PATENT DOCUMENTS 4,596,832 A 6/1986 Nagao et al.
5,453,453 A * 9/1995 Lamon et al.

FOREIGN PATENT DOCUMENTS

| EP | 0 635 537 | 1/1995 |
| EP | 0 860 465 | 8/1998 |
| GB | 903 564 | 8/1962 |
| GB | 1 080 619 | 8/1967 |
| GB | 1 282 014 | 7/1972 |
| WO | 98 37131 | 8/1998 |

OTHER PUBLICATIONS

Chemical Abstracts, vol. 72, No. 12, Mar. 23, 1970.

* cited by examiner

Primary Examiner—Morton Foelak
(74) Attorney, Agent, or Firm—Pillsbury Winthrop LLP

(57) ABSTRACT

Foamed thermoplastic polyolefin elastomer is formed by heating a foamable thermoplastic polyolefin elastomer-containing polymeric composition containing each of a first water-releasing blowing agent which is at least one of metal hydroxide and water hydrate of a salt of a metal of Group 1 or Group 2 of the Periodic Table and a second blowing agent which is neither a metal hydroxide nor a water hydrate of a salt of a metal of Group 1 or Group 2 of the Periodic Table, to a temperature above the melting point of the polyolefin elastomer. The second blowing agent may be a chemical blowing agent and may release, water, a mixture of water and carbon dioxide or another gas, including carbon monoxide, carbon dioxide, and nitrogen.

21 Claims, No Drawings

FOAMED THERMO-ELASTIC ARTICLE

This application is a continuation of PCT/NL99/00382, filed Jun. 21, 1999, which claims the benefit of U.S. Provisional Application 60/090,316 filed Jun. 23, 1998.

FIELD OF THE INVENTION

The present invention relates to a process for preparing a foamed polymeric article comprising heating a polymeric composition, said composition comprising a thermoplastic polyolefin elastomer, a first blowing agent and a second blowing agent, to a temperature at which the first blowing agent releases water, to foam said thermoplastic polyolefin elastomer, said temperature being above the melting point of the thermoplastic polyolefin elastomer. The invention also relates to the polymeric composition and to a foamed article obtainable by the process of the invention.

BACKGROUND OF THE INVENTION

A process is known from EP-A-40,934, in which a blend of a polyolefin resin and a rubber is foamed by the use of either chemical or physical blowing agents.

A drawback of the known process is that the proposed blowing agents (e.g. chemical blowing agents, (understood to be chemical compounds which decompose under heating, to liberate one or more gaseous components, such as azodicarbonamides), or physical blowing agents, (understood to be compounds, which for foaming purposes is heated to a temperature at which the compound is gaseous, such as chlorofluorocarbons or low boiling hydrocarbons)) have all their disadvantages, like inefficiency, and/or a detrimental influence on the ozon-layer of the earth-atmosphere. An overview of blowing agents can be found in "Handbook of Polymeric foam and foam technology, (edt. by D. Klempner and K. C. Frisch; Hansen Publishers, 1991)", esp. chapter 17 (page 376–408).

It has been proposed to use gases, like $N_2$ or $CO_2$, as an alternative, but they are difficult to mix in thermoplastic elastomers.

In the prior art the use of liquid water as a blowing agent is known. WO-92/18326 as well as EP-A-503,220 describe a process for the preparation of foamed thermoplastic elastomers in which the thermoplastic polyolefin elastomer is heated to a temperature above its melting point, after which water is added to the melted thermoplastic polyolefin elastomer and the mixture is released to atmospheric pressure.

Such a process has many drawbacks: the liquid water has to be injected and mixed with the thermoplastic polyolefin elastomer; the process results in a non-uniform foam having large and irregular shape as well as surface roughness. Such a process also requires special equipment for the mixing of the ingredients and the metering of the water.

R. Niemark ("New low density TPE-V foams produced in conventional processing equipment", at Foamplas '97) indicates in his article the use of a chemical blowing agent in the form of a filler, whereby the chemical blowing agent decomposes when heated to release water.

SUMMARY OF THE INVENTION

The present invention provides a solution for the above problems. The present invention relates to a process for preparing a foamed polymeric article comprising heating a polymeric composition, said composition comprising a thermoplastic polyolefin elastomer, a first blowing agent and a second blowing agent, to a temperature at which the first blowing agent releases water, to foam said thermoplastic polyolefin elastomer, said temperature being above the melting point of the thermoplastic polyolefin elastomer, characterized in that said first blowing agent is a water releasing chemical compound selected from the group consisting of a metal hydroxide, a Group 1 or 2 of the Periodic Table (CRC Handbook of Chemistry & Physics, 1990) metal salt containing hydrate water or mixtures thereof, and said second blowing agent not being a metal hydroxide or a Group 1 or 2 of the Periodic Table metal salt containing hydrate water.

The invention also relates to a foamable polymeric composition; it also relates to a foamed polymeric article foamed from the foamable polymeric composition.

It has been found that specifically the combination of the at least one first and the at least one second blowing agent results in highly improved properties of the foams prepared by the process of the present invention, compared to the results of the known blowing agents.

DETAILED DESCRIPTION OF THE INVENTION

The present invention provides a solution for the above problems. The invention concerns a process for making a foamed polymeric article from a thermoplastic polyolefin elastomer (hereinafter also abbreviated as TPOE).

The present process comprises heating a mixture comprising a thermoplastic polyolefin elastomer, a first blowing agent in the form of a water releasing chemical compound, and a second, different blowing agent, to a temperature at which the elastomer foams (typically, this is the temperature at which the water releasing chemical compound releases water), to foam said thermoplastic polyolefin elastomer, said temperature being above the melting point of the thermoplastic polyolefin elastomer.

Examples of the first blowing agent comprise:

1) metal salts of Group 1 or 2 of the Periodic Table (CRC Handbook of Chemistry & Physics, 1990), charcterised in that the anion is a phosphate, chromate, sulfate, borate or the like, said salts containing hydrate water. Suitable salts include, for instance, magnesium sulfate dihydrate, magnesium sulfate heptahydrate, calcium sulfate dihydrate, potassium citrate monohydrate, tricalcium phosphate monohydrate, sodium perborate tetrahydrate, barium acetate monohydrate and barium borate heptahydrate, among others;

2) suitable, water-releasing metal hydroxides include, among others, aluminium trihydrate (ATH), also known as aluminium trihydroxide ($Al(OH)_3$), and magnesium hydroxide ($Mg(OH)_2$).

In a preferred process of the present invention the first blowing agent may only release its water (at least in substantial amounts) at a temperature at or above the melting point of the TPOE, as a result of which the TPOE is melt processable. The water release temperature on the other hand may be not so high, that such temperature is detrimental for the thermoplastic polyolefin elastomer to be foamed. The appropriate first blowing agent can therefor be selected upon choosing the TPOE to be foamed (and therefore knowing the range of the temperature in which the TPOE can be processed (for instance the melting point and the decomposition temperature of that TPOE)). Analytical instruments like DTA (differential thermal analysis), DSC (differential scanning calorimetry) or TGA (thermogravimetric analysis) can be used to determine the suitability of a potential first blowing agent for the intended purpose.

In addition to the first blowing agent, a second, different blowing agent is used. This second blowing agent has surprising found to be able to improve the foaming process, and as a result thereof the physical properties of the obtained foam, where the second blowing agent is not capable of obtaining such results by itself.

The second blowing agent can in general be any blowing agent suitable for foaming thermoplastic elastomers. Reference is again given to the "Handbook of Polymeric foams and foam technology", mentioned supra.

More preferred, the second blowing agent comprises a chemical blowing agent; even more preferred it comprises a chemical blowing agent which is capable of releasing water at effective foaming conditions.

Another suitable chemical blowing agent, is an agent which is capable of releasing carbon dioxide and water. A preferred blowing agent of this type includes those compositions comprising carbonate containing and acid containing compositions, referred to herein as carbonate/acid combinations. Such carbonate/acid combination can favourably be applied in a process according to the present invention, resulting in improved foam properties. Commercially available examples of this type of these second blowing agents are Hydrocerol® (from B.I. Chemicals), Hostatron® (from Hoechst Celanese) and Activex® (from Huber). Preferred agents include a citric or tartaric acid in combination with a Group 1 metal carbonate (like sodium carbonate).

In addition, chemical blowing agents which are capable of releasing $N_2$ (like Expandex® from Uniroyal), $CO$, $CO_2$ or the like are applicable in the process according to the invention.

The selection of the second blowing agent must be made under the restriction that this second blowing agent must be effective at the selected foaming conditions of the TPOE, and in sofar the selection criteria as indicated for the first blowing agent are applicable.

The use of the combination of blowing agents results, at a desired foam density, in a more desirable increase in the hardness of the resulting foam. The use of the second blowing agent alone even will not result in the desired physical properties at all (like tensile strength and elongation at break), nor can it be used for the preparation of foams with a low density (especially foams with a density below 300 kg/m$^3$).

Generally, the first blowing agent is present in an amount of 5–99.5 wt. %; preferably the first blowing agent is present in an amount of 50–99.5 wt. %, all relative to the total amount of the first and second blowing agents.

The mixture of the TPOE with the first and second blowing agent, as used in the present invention, can be made according to several processes:

a) the TPOE and the blowing agents can be dry blended, and then introduced as a blend to the equipment in which the foaming takes place;

b) the blowing agents and the TPOE can be mixed at a temperature above the melting point of the TPOE, but below the temperature at which the first blowing agent releases its water, and/or below the activation temperature of the second blowing agent. Thereafter this melt mixture can either be processed to pellets (by for example extrusion and cooling), or directly processed into a foaming equipment. The melt-mixing of the blowing agents and TPOE as well as the foaming of the TPOE can take place in one apparatus, provided that the melt mixing and the foaming take place under different temperature conditions to avoid premature release of water before a thorough mixing and dispersion of the blowing agent in the TPOE has taken place.

The TPOE is a family of thermoplastic polyolefin elastomers comprising a blend of a (semi-) crystalline polyolefin resin and a rubber dispersed in said resin. In general these blends comprise from 15–85 parts by weight of polyolefin resin and correspondingly from 85–15 parts by weight of rubber.

The polyolefin resin in such a TPOE can be one or more polyolefins orginating from a (co-)polymerisation of $\alpha$-olefins, such as ethylene, propylene, butene-1 and others, as well the crystalline polycycloolefins. They have to behave like a thermoplastic and have a DSC crystallinity of at least 15%. A preference is present for homo- and copolymers of polyethylene and polypropylene; in the case of copolymers of said polyolefins the content of ethylene resp. propylene in said copolymer is at least 75 wt. %.

The rubber in the TPOE used according to the invention can be any rubber known in the art, provided that the rubber is stable under the foaming conditions. Rubbers useful are butylrubber (copolymer as well as terpolymers, and also in its halogenated form); ethylene/$\alpha$-olefin copolymer rubber (EAM) as well as ethylene/$\alpha$-olefin/diene terpolymer rubber (EADM); acrylonitrile/butadiene rubber (NBR); styrene/butadiene rubber (SBR); natural rubber (NR). In case of EAM or EADM rubber, the $\alpha$-olefin in such a rubber is preferably propylene; in such a case the rubber is referred to as EP(D)M. It is also possible to use a mixture of such rubbers.

With more preference the TPOE is a thermoplastic polyolefin vulcanizate (TPOEV), in which the dispersed rubber is at least partially cured (i.e. vulcanized). Here and hereinafter a TPOE is called a TPOEV when the rubber in the TPOE has a degree of vulcanization such that the amount of extractable rubber is less than 90%. The test to determine such an extractable amount is generally done with a solvent in which the polyolefin as well as the not-vulcanized rubber are soluble, but in which the vulcanized rubber is not soluble. A suitable solvent is boiling xylene.

By vulcanizing the rubber in a TPOE, the physical properties of the resulting TPOEV, as well as the physical properties of the resulting foamed article are improved. By using a TPOEV in the process according to the invention a foam having a very fine cellular structure and a very smooth surface is obtained.

The vulcanization of the rubber in a TPOE can be performed with any vulcanization system that is known in the art to vulcanize the rubber in the TPOEV. In the case of EA(D)M-rubber sulphur systems, peroxide systems, silicon-based curing systems, and preferably vulcanization systems based on a phenolic resin are used.

To enjoy the best effects of the vulcanization, the TPOEV is preferably vulcanized to the extend that the amount of extractable rubber is less than 15%, more preferred even less than 5%.

Preferably, the TPOEV is prepared in a dynamic vulcanization process, which as such is known in the art. Alternatively, vulcanized rubber particles (preferably having a size below 10$\mu$, more preferred below 1$\mu$) can be mixed in the (semi-)crystalline polyolefin.

The use of the first blowing agent in the process for preparing a foamed polymeric article according to the invention enables the skilled man to perform a very controlled foaming process. The amount of water released from the first blowing agent is a function of the temperature and the residence time in the foaming process. For that reason the foam density can be easily controlled; the same composition can be used to make polymer foams of different densities. As care is taken in the process according to the invention to prepare a good dispersion of the first blowing agent in the TPOE, the first blowing agent also acts as a nucleating agent which gives very fine and uniform cell structure.

Also a good dispersion of the second, different blowing agent into the TPOE even further improves the results of the invention. The temperature at which the second blowing agent becomes effective must be carefully selected to be within the working window of the foaming conditions of the selected TPOE.

To achieve the good dispersion of the blowing agent(s), such a blowing agent, when in solid form added to the TPOE, must be in the form of fine, small, dispersable particles. Generally the particle size is in the range of 0,01–100 $\mu$m and more preferably such a blowing agent has a particle size below 50 $\mu$m. This results in a large number of well dispersed nucleating sites within the TPOE.

The foaming process can be performed in any equipment that is known and suitable for foaming of a thermoplastic elastomer. This can be done either in a static process, as well as in a dynamic process. In the first case, mentioning can be had to foaming in a predetermined shape, or thermoforming by the use of a heated shape. In these cases, the TPOE is locally heated to the foam temperature and is thus foamed.

By preference an extruder is used. When the same equipment is used for both the mixing process of the blowing agents and the TPOE, as well as for the foaming process, care has to be taken that the TPOE is first melted and thoroughly mixed with the blowing agents to obtain, preferably an at least substantial, uniform distribution of the blowing agents in the TPOE; the temperature is then raised to at least a temperature at which the blowing agents become effective, the resulting mix is extruded, e.g. through a die, and a foamed TPOE is obtained.

In the mixing part of the process (i.e. the mixing of the TPOE and the blowing agents), whether this is a separate process, or integrated with the foaming process, the temperature should be carefully controlled in order to prevent premature release and volatilization of the water from the first blowing agent, as well as to prevent the second blowing agent to become effective. When the mixture is then heated to conditions where the blowing agents are effective, and whereafter the pressure is released, the TPOE expands to a foamed article.

The mixing of the blowing agents with the TPOE generally takes place at any temperature between 0° C. and the temperature at which at least one of the blowing agents starts to release water. This temperature, if not already known from literature, can easily be determined by analytical instruments as DTA, DSC and TGA. The temperature at which the mixing of the blowing agents with the TPOE takes place depends on the type of mixture aimed at: a dry blend or a melt blend. In the last case the mixing temperature is above the melting point of the TPOE but below the temperature at which the blowing agents start to liberate gas. In general it is preferred that the mixing of the TPOE with the blowing agents takes place at a temperature within the range of 10–250° C. and that the water is released at a temperature within the range of 120–350° C. (provided that the mixing temperature is below the water-release temperature of the first blowing agent and the gas-liberating temperature of the second blowing agent).

Standard single screw extruders with a good heating and cooling system can be used to make TPOE foam profiles. The size of the extruder needed depends on the cross sectional area of the profile and the through put rate required. For a typical automotive seal profile, an extruder with a 60 to 90 mm diameter screw is preferred. A screw with a minimum 24:1 L/D ratio is preferred. The screw can be a general-purpose screw with a compression ratio of 3:1, a low work barrier screw or other types of screws commonly used for processing of TPOE'S. A static mixer or a similar device can also be used to increase the residence time, to improve the mixing, and/or to reduce the melt temperature of the composition being processed. The extrusion dies should be designed such that high pressure is maintained in the melt for as long as possible to prevent the premature foaming of the composition in the extruder and in the die.

Extrusion foaming of a TPOE consists of three fundamental steps: bubble initiation (nucleation), bubble growth, and stabilization. Nucleation sites are provided mainly by blowing agent particles dispersed within the polymer melt. To achieve low density foams with small uniform cell structure and a smooth skin it is preferred to move the bubble growth point as close as possible to the exit of the die. This can be accomplished by using a die with a sharp converging geometry and short land length. The presence of particles of the blowing agents is very important to the process. They provide control of cell size and their distribution. The use of the pre-compounded blowing agents produces a uniform distribution of blowing agents within the polymer melt and produces even cell distribution. The driving force for the cell growth is the pressure difference between the internal vapor pressure and the ambient pressure. The growth will continue until the bubbles stabilize or rupture. Bubbles are stabilized by the rapid rise in polymer viscosity which is caused by loss of heat by the cooling process and/or by the crystallisation of the polyolefin in case of a TPOE. A water bath cooling system with a belt puller can be used for foam profiles with densities higher than 300 kg/m$^3$. For foam profiles with densities lower than 300 kg/m$^3$, the water bath cooling system may induce uneven shrinkage of the profiles. In such cases, air and/or water mist spray cooling systems with a long conveying belt are preferred. FIG. 1 shows schematically an extruder for the foaming of a TPOE with ATH as the first blowing agent, for which the typical indicated temperature profiles apply:

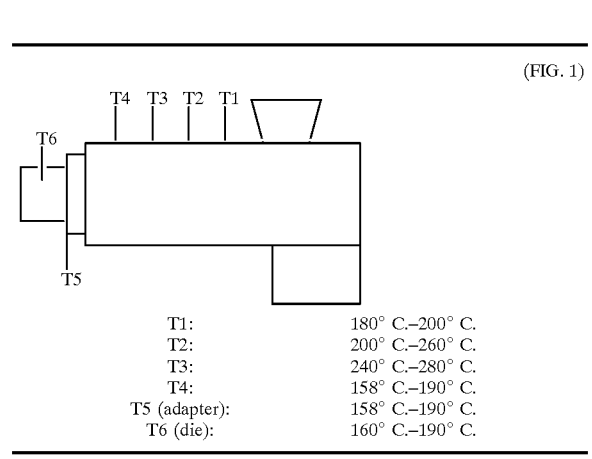

(FIG. 1)

| | |
|---|---|
| T1: | 180° C.–200° C. |
| T2: | 200° C.–260° C. |
| T3: | 240° C.–280° C. |
| T4: | 158° C.–190° C. |
| T5 (adapter): | 158° C.–190° C. |
| T6 (die): | 160° C.–190° C. |

The man skilled in the art can easily adjust the configuration of the temperature setting of the extruder, when using other types of blowing agents.

Preferably the temperature profile of the barrel is set in such a way that T1 and T4 are lower than T2 and T3. Some single screw extruders with a smaller L/D ratio (such as 24:1) may have only three heating zones on the barrel. The temperature profiles of these extruders and the extruders attached with a static mixer or a similar device should be set such that the middle zone of the extruder has the highest temperature profile. The temperature of the die should be set to a point low enough to ensure a high head pressure and high enough to provide a smooth profile surface. The head pressure should be kept roughly above 3.5 MPa to prevent premature foaming of the composition in the extruder and in the die. The head pressure is effected by the melt temperature and the throughput rate. It can be adjusted by changing the barrel temperature settings in zone 4 (T4) and in the die (T6), and the screw speed. The most powerful parameter effecting the head pressure is the barrel temperature in zone 4 (T4) and the die temperature.

The foam density depends on the temperature in the middle zone of the extruder and on the screw speed. The higher that temperature and the lower the screw speed, the lower the foam density that can be achieved. In principle, foams of different densities ranging from 150–900 kg/m$^3$ can be achieved by changing the extrusion temperature profile and adjusting the screw speed.

The screw speed is generally in the range of 10 to 80 rpm depending on the throughput rate, the screw design, size of the extruder and the density of the foam to be produced. In general, the screw speed should be set at the lower end of the range if possible to maximize the residence time of the foamable composition in the barrel. An extrusion throughput rate of 5–100 kg/hr with an extrusion line speed of 3–90 m/min. can be achieved with a 60 to 90 mm diameter single screw extruder. The actual throughput rate and the line speed depend on the foam density, the screw speed, the cross sectional area of the profile, the foaming conditions, the screw geometry, and the die design.

The following procedure can be used as a general guideline for adjusting the foam density of a TPOE product based on a TPOEV, using ATH as the first blowing agent. The skilled man can easily adjust the condition for other specific TPOE's and other first blowing agents. It can also be used to generate a calibration curve of foam density vs. processing conditions for a new extrusion line or a new die.

1) Set the temperature profile of the extruder barrel as a starting point: T1=190° C., T2=230° C., T3=245° C., T4=165° C., T5=165° C., and T5=175° C.;

2) Add the TPOE in which the blowing agents have been premixed (either by dry blending or by melt-blending) to the hopper and run the extruder for about 30 min, and then take a foam sample for density measurement. It is always recommended to start the foaming process with higher foam density and decrease the foam density gradually by increasing the temperature settings in the middle zones of the extruder;

3) If the foam density is higher than the desired value, increase the temperatures at the second and the third zones by about 2 to 10° C. depending on how far away the density is from the desired value. If the foam density is lower than the desired value, lower the temperatures at the second and the third zones slightly. Wait for 20 to 30 min after the temperature reach the new set points. Collect another foam sample and measure the density again. Sometimes, it may take longer than 30 min to stabilize the foaming process after a drastic change of the temperature profile.

4) Repeat step 3 until the desired foam density is reached. Sometimes a small change in the other zones or at the die may be needed to fine-tune the foam density and product quality.

The amount of the first blowing agent used in the process according to the invention depends on the density of the foam to be prepared, but of course also on the amount of water which can and is released per unit weight of said first blowing agent. The more water is released per unit weight of the first blowing agent, the less of said agent is needed for a given foam density. On the other hand, there is no need for the first blowing agent to release all its potential water.

In cases where the first blowing agent is capable of exhibiting additional beneficial properties, e.g. also an activity as a flame retardant (like ATH, as an example), there is no requirement that all of the first blowing agent is decomposed during the foaming process. As a result a foamed article with improved flame retardancy is obtained. To obtain a flame-retardant foamed article it is also possible to use a combination of such a first blowing agent, which behaves like a flame retardant, and standard flame retardants, known in the art. To obtain a certain foam density, it is, according to the process of the present invention, found that a substantial reduction of the amount of first blowing agent can be obtained, when said agent is combined with the second, different blowing agent. This combination results in a foam with improved properties, compared with a foam prepared with either of both blowing agents.

Surface treatment of one or more of the solid blowing agents can also influence the foaming process and the physical properties of the foamed article. Improvement of the properties can be obtained by the use of a blowing agent which is treated with a surface coating and/or surface coupling agents. Surface treatment of fillers in polymers is already known (see U.S. Pat. No. 4,525,494) for long. It has now been found that also the properties of foam made of a TPOE are markedly improved by the use of such surface coating and surface coupling agents. Benificial effects can be had with a blowing agent, especially a first blowing agent, which is surface coated with a silane coupling agent, being an organosilicon compound having the formula:

$$R-SiX_3$$

in which R is a hydrolysis-insensitive organofunctional group, and each X is a hydrolyzable group which can be converted on hydrolysis to a silanolgroup. In general the R-group comprises a functional hydrocarbon group, being substituted with a functional group, like an amino, (meth-) acrylate, stryrylamine, epoxy, or halogengroup. The X-group preferably is an alkoxy or acetoxy group, more preferably a methoxy group. Reference can be made to the brochure "A Guide to Dow Corning Silane coupling agents" for that type of silane, suitable for the surface treatment of a blowing agent.

It has been found advantageous to treat the blowing agent with a vinylsilane (a vinyl substituted organo silicon compound), which treatment improves the melt strength of the foamed article. Examples of such vinylsilanes are vinyl-trimethoxysilane and vinyl-triacetoxysilane. Preferably a vinylalkoxysilane is used.

Use can also be made of a blowing agent which is surface coated with an organotitanate, an organo zirconate or an organoaluminate coupling agent (like the alkoxy-, neo-alkoxy and cycloheteroatom derivatives thereof).

Examples of titanates useful as surface coating are monoalkoxy dioctyl pyrophosphato titanate, neoalkoxy dioctyl pyrophosphato titanate, and the acetylacetonate based titanates. For more information, reference is given to the manual of Kenrich Petrochemical, Inc., "Ken-React Reference Manual-Titanate, zirconate and aluminate coupling agents", by Salvatore J. Monte (1985/1987). This manual also discloses several of such coupling agents, suitable for surface coating of one or more of the blowing agents, used in the present invention.

During the foaming process the amount of water released from the first blowing agent, plus the amount of gas from the second blowing agent, must be sufficient to effect foaming, such as an amount in the range of 0.1–5 wt. %, relative to the TPOE.

When a process according to the invention is used to prepare a foamed TPOEV, it is preferred that the vulcanization of the TPOEV is (at least almost) completed before the foaming process takes place. Otherwise it can be the case that the foaming process has too much influence on the vulcanization process to obtain acceptable foamed TPOEV articles.

The pressure at which the foaming process takes place is not different from the pressure-range at which conventional foaming of TPOE takes place.

At the end of the foaming process according to the present invention, the mixture is released to atmospheric conditions, preferably combined with a shaping operation (like the formation of a shaped foamed profile). Here and hereinafter the term "atmospheric conditions" means a pressure having a value of about 0.1 MPa, but the foaming process can also be concluded at a release pressure which is somewhat lower or higher than 0.1 MPa.

The thermoplastic elastomers used in the process according to the present invention can also contain other ingredients for adjusting the physical properties of the foamed article. The rubber in the TPOE can contain extender oil, the TPOE can contain additionally waxes, fillers, colorants, antidegradants, UV stabilizers and the like.

The invention also relates to the foamable polymeric composition, used in the process according to the invention.

The invention also relates to a foamed polymeric article, obtainable by foaming a polymeric composition according to the invention.

Such a foamed article preferably has a density in the range of 50–900 kg/m$^3$. The foam density can be controlled, e.g. target densities attained, by judicious selection of the first and of the second blowing agent, water-release temperature and the residence time in the foaming equipment.

The foamed articles, prepared according to the process of the present invention, have controlled cell structures throughout profiles, tubes, sheets and the like, with a smooth surface. The so prepared foams can be combined with other (foamed) TPOE'S, and traditional thermoset systems used throughout the automotive, construction, appliance, marine, sportsequipment and electronic industries. It can also be combined with rubbers, or (reinforced) polyolefins. The foams of the present invention offer a large opportunity for use in the automotive industry for door, window, and hood seals.

The foam, prepared in the process of the present invention, can be used for several purposes: weight reduction; vibration reduction; energy absorption; sealing; friction improvement; cushioning; insulation (thermal, acoustic, as well as electrical); intumescent foams.

Applications in which the present technology can be used are e.g.: belt strips; patch seals; soft touch (knobs-grips); sunvisors; vent seals; carpet backing; headliners; seating; run flat tires; sporting pads; wet suits; footwear; first aid equipment; fabric backing; diapers; tapes; different toys; blankets/pads; luggage; ducting; floats/bumpers; bandaids; ear plugs; cups; pads/mattresses; office furniture.

The foaming process of the present invention can be used in different forms: extrusion; injection molding; thermo foaming; blow molding; rotational molding; foam casting. The foaming process of the present invention can also be used for co-extrusion of foam parts with solid parts, or for coating of foamed profiles with a solid polymer skin, which provides improved tear strength and low coefficient of friction.

The foam structure can be either uniform (i.e. bulk foaming) or also selective by applying a foam gradient, or a foamed region (constrained by pressure or foamed locally by focused energy).

The ingredients present in the foamable polymeric composition as well as in the foamed polymeric article according to the invention have been described above.

The invention will be elucidated by the following examples and comparative experiments, which are intended to demonstrate, but not to restrict, the invention. The physical properties of the samples were measured according to the following ASTM-norms:

density: ASTM D792 tensile strength: ASTM D412

Elongation at break: ASTM D412

EXAMPLES I TO V AND COMPARATIVE EXPERIMENTS A–F

The following Examples and comparative experiments show the effect of the use of ATH (as the first blowing agent) in combination with a second, other chemical blowing agent on the foamability of a thermoplastic polyolefin elastomer.

Compound A was a thermoplastic polyolefin elastomer composition having a Shore A hardness of about 68A. The Sarlink® thermoplastic polyolefin elastomer A was a blend of polypropylene and phenolic cured particulate EPDM rubber in a ratio of rubber to plastic of about 63 to 37. The EPDM rubber had an amount of extractable rubber (in boiling xylene) of about 10%. Compound B was a melt blend of compound A (82 wt. %) with 15 wt. % of ATH (432-SP, from J. M. Huber) and 3 wt. % of polypropylene based carbon black concentrate (30% carbon black loading). Compound B had a Shore A hardness of about 72A. Compound C was a meltblend of compound A (70 wt. %) with 30 wt. % of ATH (432-SP, from J. M. Huber). Compound C had a Shore A hardness of about 75A. Both compounds B and C were prepared by mixing the compound A with ATH powder (and, in case of compound B, the carbon black concentrate) using a Ferro continuous mixer at a melt temperature of 200° C.

Compound D was a dry blend of compound B (99 wt. %) with 1 wt. % of Hydrocerol (chemical blowing agent concentrate containing 40 wt. % of active ingredients (HP-40P, from B.I. Chemical, Inc.)). Hydrocerol HP 40P is an endothermic chemical blowing agent capable of releasing carbon dioxide and water at temperatures above 180° C.

Compound E was prepared by first coating the compound B with mineral oil and later mixing the oil coated compound B with Expandex 5PT powder (from Uniroyal Chemical Company, Inc.) at a ratio of 98.5/0.5/1 by weight (compound B/mineral oil/Expandex 5PT). Expandex 5PT (5-phenyl tetrazole) is an exothermic chemical blowing agent capable of releasing nitrogen at temperatures of about 240–250° C.

A 38.1 mm single screw extruder equipped with a 24:1 L/D ratio general purpose screw was used in the following foaming experiments. A 2.4 mm circular die with a L/D ratio of 1:1 was used for all the Examples and comparative experiments shown in Tables 1 to 3.

As shown in Tables 1 to 3, the addition of a second blowing agent such as Hydrocerol HP 40P and Expandex 5PT to compound B containing 15 wt. % of ATH further reduced the density of the foams to a level close to the densities of the foams made with compound C containing only 30 wt. % of ATH. This means that the addition of a small amount of extra blowing agents next to and in addition to ATH can greatly reduce the amount of ATH needed. A reduction in ATH content improves the physical properties of the foamable compound as well as those of the foamed products.

TABLE 1

Effect of a second blowing agent on foamability

| Examples/Comp. Exp. | A | B | I |
|---|---|---|---|
| Foaming compound | Compound B | Compound C | Compound D |
| Foaming agent | 15 wt. % ATH | 30 wt. % ATH | 14.9 wt. % ATH & 1 wt. % HP 40P (concentrate) |
| Screw speed, RPM | 10 | 10 | 10 |
| Temp. at $1^{st}$ zone, °C. | 200 | 200 | 200 |
| Temp. at $2^{nd}$ zone, °C. | 270 | 270 | 270 |
| Temp. at $3^{rd}$ zone, °C. | 165 | 165 | 165 |
| Adapter temperature, °C. | 165 | 165 | 165 |
| Die temperature, °C. | 175 | 175 | 175 |
| Foam density, kg/m$^3$ | 533 | 120 | 229 |
| Foam diameter, mm | 4.15 | 5.10 | 6.15 |
| Tensile strength of the foam, MPa | 3.53 | 0.56 | 1.08 |
| Elongation at break, % | 591 | 46 | 304 |

Comparative Experiments G and H (Foaming of a TPOE using Hydrocerol HK as a blowing agent).

Hydrocerol HK is an endothermic chemical blowing agent in powder form manufactured by B.I. Chemicals Inc. It is capable of releasing carbon dioxide and water at temperatures above 180° C. Hydrocerol HK and compound A were used to prepere compounds F and G. Compound F was prepared by first coating the compound A with mineral oil and later mixing the coated compound A with Hydrocerol HK at a ratio of 98/0.5/1.5 by weight (compound A/mineral oil/Hydrocerol HK). Compound G was prepared the same way and contained 3.0 wt. % of Hydrocerol HK.

The same equipment used in Examples I to V was used in the following foaming experiments. Results of these experiments are shown in Table 4. It was found during the foaming experiments that the foam density depends strongly on the amount of blowing agent used. In general, it was found difficult to foam a TPOE to a density lower than 350 kg/m$^3$ by using Hydrocerol HK chemical blowing agent alone.

TABLE 2

Effect of a second blowing agent on foamability

| Examples/Comp. Exp. | C | D | II | III |
|---|---|---|---|---|
| Foaming compound | Compound B | Compound C | Compound D | Compound E |
| Foaming agent | 15 wt. % ATH | 30 wt. % ATH | 14.9 wt. % ATH & 1 wt. % HP 40P (concentrate) | 14.8 wt. % ATH & 1 wt. % Expandex 5 PT (powder) |
| Screw speed, RPM | 10 | 10 | 10 | 10 |
| Temp. at $1^{st}$ zone, °C. | 180 | 180 | 180 | 180 |
| Temp. at $2^{nd}$ zone, °C. | 265 | 265 | 265 | 265 |
| Temp. at $3^{rd}$ zone, °C. | 165 | 165 | 165 | 165 |
| Adapter temperature, °C. | 165 | 165 | 165 | 165 |
| Die temperature, °C. | 175 | 175 | 175 | 175 |
| Foam density, kg/m$^3$ | 607 | 281 | 309 | 442 |
| Foam diameter, mm | 4.10 | 5.53 | 5.44 | 4.63 |
| Tensile strength of the foam, MPa | 3.69 | 1.15 | 1.78 | 2.55 |
| Elongation at break, % | 601 | 237 | 537 | 589 |

TABLE 3

Effect of a second blowing agent on foamability

| Examples/Comp. Exp. | E | F | IV | V |
|---|---|---|---|---|
| Foaming compound | Compound B | Compound C | Compound D | Compound E |
| Foaming agent | 15 wt. % ATH | 30 wt. % ATH | 14.9 wt. % ATH & 1 wt. % HP 40P (concentrate) | 14.8 wt. % ATH & 1 wt. % Expandex 5 PT (powder) |
| Screw speed, RPM | 15 | 15 | 15 | 15 |
| Temp. at $1^{st}$ zone, °C. | 180 | 180 | 180 | 180 |
| Temp. at $2^{nd}$ zone, °C. | 265 | 265 | 265 | 265 |
| Temp. at $3^{rd}$ zone, °C. | 165 | 165 | 165 | 165 |
| Adapter temperature, °C. | 165 | 165 | 165 | 165 |
| Die temperature, °C. | 175 | 175 | 175 | 175 |
| Foam density, kg/m$^3$ | 611 | 329 | 385 | 463 |
| Foam diameter, mm | 4.19 | 5.57 | 5.08 | 4.57 |
| Tensile strength of the foam, MPa | | 1.38 | 2.10 | 2.80 |
| Elongation at break, % | | 277 | 452 | 530 |

TABLE 4

TPOE foaming using Hydrocerol HK (powder) as blowing agent

| Comp. Exp. | G | H |
|---|---|---|
| Foaming compound | Compound F | Compound G |
| Foaming agent | 1.5 wt. % HK | 3.0 wt. % HK |
| Screw speed, RPM | 25 | 25 |
| Temp. at 1st zone, °C. | 180 | 180 |
| Temp. at 2nd zone, °C. | 210 | 210 |
| Temp. at 3rd zone, °C. | 210 | 210 |
| Adapter temperature, °C. | 155 | 155 |
| Die temperature, °C. | 160 | 160 |
| Foam density, kg/m$^3$ | 705 | 534 |
| Foam diameter, mm | 4.23 | 4.48 |
| Tensile strength of the foam, MPa | 2.78 | 1.87 |
| Elongation at break, % | 417 | 353 |

COMPARATIVE EXPERIMENTS I TO L (Foaming of a TPOE using Hydrocerol HP 40P chemical blowing agent).

Dry blends of compound A with Hydrocerol HP 40P at different ratios (shown in Table 5) were used in the following-foaming experiments. The same equipment used in the previous Examples was also used in the following experiments.

It was found in these foaming experiments that medium density TPOE foams can be achieved by using Hydrocerol HP 40P as a sole blowing agent. However, it was difficult to foam the compound A to a density lower than 300 kg/m$^3$.

TABLE 5

TPOE foaming using Hydrocerol HP 40P as a blowing agent

| Examples/Comp. Exp. | I | J | K | L |
|---|---|---|---|---|
| Foaming compound | Compound H | Compound I | Compound I | Compound J |
| Foaming agent | 3.0 wt. % HP 40P | 5.0 wt. % HP 40P | 5.0 wt. % HP 40P | 7.0 wt. % HP 40P |
| Screw speed, RPM | 20 | 20 | 20 | 30 |
| Temp. at 1st zone, °C. | 180 | 180 | 180 | 180 |
| Temp. at 2nd zone, °C. | 220 | 220 | 200 | 200 |
| Temp. at 3rd zone, °C. | 220 | 220 | 200 | 200 |
| Adapter temperature, °C. | 155 | 155 | 155 | 155 |
| Die temperature, °C. | 165 | 165 | 165 | 165 |
| Foam density, kg/m$^3$ | 524 | 445 | 360 | 330 |
| Foam diameter, mm | 3.98 | 4.19 | 4.82 | 4.97 |
| Tensile strength of the foam, MPa | 2.13 | 1.41 | 1.13 | 0.83 |
| Elongation at break, % | 408 | 314 | 339 | 270 |

Comparison of Physical Properties of Foams made with Different (set of) Blowing Agents The tensile strength of the TPOE foams made with the combination of first and second blowing agent is, in general, higher than that of the foams made with the first blowing agent alone at the same density level. The foams made with the second blowing agent alone showed the worst tensile strength at the same density level. The elongation at break follows a similar trend as the tensile strength.

What is claimed is:

1. Process for preparing a foamed polymeric article comprising heating a polymeric composition, said composition comprising a thermoplastic polyolefin elastomer, a first blowing agent and a second blowing agent, to a temperature at which the first blowing agent releases water, to foam said thermoplastic polyolefin elastomer, said temperature being above the melting point of the thermoplastic polyolefin elastomer, wherein said first blowing agent is a water releasing chemical compound selected from the group consisting of a metal hydroxide, a Group 1 or 2 or the Periodic Table metal salt containing hydrate water or mixture thereof, and wherein said second blowing agent is not a metal hydroxide or a Group 1 or 2 of the Periodic Table metal salt containing hydrate water.

2. Process according to claim 1, wherein the second blowing agent comprises a chemical blowing agent.

3. Process according to claim 1, wherein the second blowing agent releases water, $CO_2$, or nitrogen at effective foaming conditions.

4. Process according to claim 3, wherein the second blowing agent releases carbon dioxide and water at effective foaming conditions.

5. Process according to claim 4, wherein the second blowing agent includes a carbonate/acid combination.

6. Process according to claim 1, wherein the first blowing agent is present in an amount of 50–99.5 wt %, relative to the total amount of blowing agent.

7. Process according to claim 1, wherein the thermoplastic polyolefin elastomer is a thermoplastic polyolefin vulcanizate having a degree of vulcanization such that the amount of extractable rubber is less than 90%.

8. Process according to claim 1, wherein the thermoplastic polyolefin elastomer comprises a polyethylene or polypropylene homo- or co-polymer or a vulcanizate thereof.

9. Process according to claim 1, wherein the first blowing agent releases water at a temperature within the range of 120–350° C.

10. Process according to claim 1, wherein the first blowing agent includes aluminum trihydrate or magnesium hydroxide.

11. Process according to claim 1, wherein the amount of released water is in the range of 0.1 to 5 wt. %, relative to the thermoplastic polyolefin elastomer.

12. Process according to claim 7, wherein the thermoplastic polyolefin elastomer is vulcanized to the extent, that the amount of extractable rubber is less than 15%.

13. Process according to claim 7, wherein the rubber in the thermoplastic polyolefin elastomer is at least one of EP(D)M—rubber, NBR, SBR and butyl rubber.

14. Process according to claim 1, wherein the mixture of the thermoplastic polyolefin elastomer with the first and second blowing agent is a dry blend.

15. Process according to claim 1, wherein the mixture comprising the thermoplastic polyolefin elastomer and the blowing agents is obtained by mixing the thermoplastic polyolefin elastomer with the blowing agents at a temperature above the melting point of the thermoplastic polyolefin elastomer, and below the temperature at which the blowing agents become effective.

16. Process according to claim 1, wherein the process is performed in an extruder.

17. Foamable polymeric composition comprising a thermoplastic polyolefin elastomer, a first blowing agent which is at least one of water releasing compound selected from metal hydroxide or a salt of a metal of Group 1 or 2 of the Periodic Table containing hydrate water, and a second blowing agent which is other than a metal hydroxide or salt of a metal of Group 1 or 2 of the Periodic Table containing hydrate water.

18. Foamed polymeric article, obtained by the process according claim 1.

19. Foamed polymeric article according to claim 18, characterized in that the article has a density in the range of 50–900 kg/m$^3$.

20. Process according to claim 1, wherein the second blowing agent is capable of releasing $N_2$, CO, $CO_2$ or mixture thereof.

21. Process according to claim 1, wherein the first blowing agent comprises aluminum trihydrate.

* * * * *